United States Patent [19]

McCullough

[11] 4,324,043

[45] Apr. 13, 1982

[54] HANDPIECE FOR MEAT-TRIMMING KNIFE

[76] Inventor: Timothy J. McCullough, Box 295, Lake Rd., Vermilion, Ohio 44089

[21] Appl. No.: 195,096

[22] Filed: Oct. 8, 1980

[51] Int. Cl.$^3$ .............................................. A22C 17/00

[52] U.S. Cl. .......................................... 30/276; 30/206

[58] Field of Search ................. 30/276, 240, 205, 206, 30/207; 168/45, 48 A; 56/12.7; 17/21

[56] References Cited

U.S. PATENT DOCUMENTS

| | | | |
|---|---|---|---|
| 1,251,925 | 1/1918 | Scheithe | 30/240 X |
| 3,165,833 | 1/1965 | Logan | 30/206 |
| 3,269,010 | 8/1966 | Bettcher | 30/276 |
| 3,605,841 | 9/1971 | Lindstrom | 30/276 |
| 3,852,882 | 12/1974 | Bettcher | 30/276 |

*Primary Examiner*—Jimmy C. Peters
*Attorney, Agent, or Firm*—Gustalo Nunez

[57] ABSTRACT

An improved handpiece for a meat-cutting tool of the type having a cutting blade rotatably mounted on a blade holder which is mounted on one end of the handpiece. A flexible drive cable enters the opposite end of the handpiece and is drivingly engaged with the blade by a pinion gear. The handpiece has a hollow handle formed of lightweight plastic which is removably mounted on the blade holder attachment portion of the handpiece by an externally threaded coupler. An O-ring is mounted within the bore of the coupler and is in sealing engagement with a tubular-shaped sleeve or ferrule mounted on the end of the drive cable casing. The O-ring prevents contaminants from flowing through the handpiece and along the casing and onto the meat product being cut by the blade. A portion of the coupler bore has a diameter complementary to the outer diameter of the ferrule sleeve which extends through the coupler bore and provides a support bearing for the sleeve within the handpiece to prevent excess twisting and flexing movement of the sleeve and subsequent separation of the cable casing therefrom. The O-ring is mounted in the support bearing portion of the coupler.

15 Claims, 9 Drawing Figures

HANDPIECE FOR MEAT-TRIMMING KNIFE

BACKGROUND OF THE INVENTION

1. Field of the Invention

The invention relates to meat-cutting devices and particularly to a power-driven meat-cutting tool adapted to be manually held and manipulated for the quick and easy removal of meat from carcasses and bones. More particularly, the invention relates to an improved handpiece construction on which the blade holder and rotatably mounted blade are attached, which is lighter in weight and more maintenance free than heretofore known handpieces.

2. Description of the Prior Art

Various styles of power-driven meat-cutting tools have been devised wherein a ring blade is rotatably mounted on a holder which in turn is mounted on a manually operated, power-driven handle or handpiece. These tools have been used for some time to facilitate the removal of meat from a carcass, primarily in a trimming operation or for removing the meat remains from the bones. These meat-cutting tools are either electrically driven or pneumatically driven. Examples of the electric meat-cutting tools are shown in U.S. Pat. Nos. 3,024,532, 3,269,010, 3,461,557, and 3,605,841.

These electrically driven tools generally consist of a tubular handpiece formed as a single, all-metallic member having a hollow bore. The annular blade holder is attached to the front portion of the handpiece with the ring blade being removably mounted thereon by various mounting arrangements. The blade is formed with gear teeth extending about the top thereof, which teeth are in driving engagement with a pinion gear mounted within the end of the handpiece. A flexible cable, one end of which is connected to a motor located adjacent to the work area, enters the rear of the handle and extends therethrough and terminates in a squared end. The squared end is engaged in a complementary opening in the rear of the pinion gear for rotatably driving the gear. The cable is surrounded by a flexible casing which terminates within an end of a hollow tubular-shaped ferrule which is located within the handpiece, with the cable continuing through the ferrule into the pinion gear. A handpiece setscrew extends radially through a threaded opening in the handpiece and terminates in a rounded end which seats in an annular groove formed in the ferrule to secure the ferrule within the handpiece. The setscrew prevents axial removal of the ferrule from the handpiece while permitting the ferrule to rotate or twist within the handle during meat-trimming procedures.

Problems have occurred with this type of construction due to the continuous turning and twisting movement of the handpiece during cutting procedures, resulting in the ferrule becoming loose within the bore of the handpiece. Continual twisting and turning movement of the handpiece will eventually enlarge the relatively small bore area within the handpiece which surrounds and supports the ferrule. Such an enlarged bore results in excessive vibration due to the high-speed rotating cable contacting the interior of the ferrule. Also, the ferrule and cable casing will pull out of the handle since the setscrew is unable to retain the same therein due to the increased bore diameter. This requires the entire handpiece to be replaced.

Another problem with known prior art electric cable-driven handpieces is that the grease which is applied to the pinion gear will work its way rearwardly within the handpiece along the casing and cable, and evenutally will drop off of the cable outside of the handpiece and onto the meat being trimmed. The grease has become sufficiently contaminated and discolored after passing through the handpiece to result in an unsanitary condition.

Still another problem with known prior handpieces is the entire metal construction thereof. These cutting knives are generally used in a cold environment that is required to maintain the meat at a low temperature. Due to the all-metal construction, the handpiece retains the cold which after a prolonged period of use becomes bothersome and uncomfortable to the operator's hand.

Another disadvantage is that damage to one part of the handpiece requires complete discarding of the handpiece due to its one-piece construction. Also, such one-piece, all-metallic construction is expensive due to the amount of metal required and the considerable amount of machining and metal working procedures to produce the final product. Furthermore, these known handpieces are difficult to clean and maintain in a sanitary condition, since they cannot be disassembled to gain access to the interior for cleaning.

No handpiece for use with an electrically driven meatcutting blade of which I am aware has eliminated many of these problems by providing a two-piece construction having means mounted within the interior of the handpiece which provides an increased bearing surface for the ferrule, which eliminates the excessive vibration problems, and in which a sealing O-ring is provided which appreciably reduces the amount of grease heretofore escaping from the handpiece while preventing outside moisture from entering the handpiece interior.

SUMMARY OF THE INVENTION

Objectives of the invention include providing an improved handpiece construction for a meat-trimming knife of the type having an annular blade holder mounted on one end of the handpiece for rotatably mounting a ring blade which contains a threaded coupler removably joining a lightweight handle formed of plastic with the blade holder front portion which is formed of metal; providing such an improved handpiece in which the threaded coupler is provided with an internal O-ring which seals against the exterior of the ferrule in which the power drive cable casing is terminated to more effectively retain the pinion drive gear grease within the handle interior preventing it from flowing along the cable casing and dropping off onto the meat being trimmed while simultaneously reducing the amount of outside moisture which enters the interior of the handpiece and contaminating the same to reduce the efficient operation of the rotating cable and pinion gear; providing such an improved handpiece in which the handle portion is formed of plastic which is lighter in weight than the prior all-metal constructions and which increases the comfort of the operator in the cold environment in which it is used due to the insulating qualities of the plastic; providing such an improved handpiece which reduces vibration of the cable and ferrule by the increasing of the effective length of the support bearings for the ferrule, thereby providing a longer usable life for both the handpiece and cable drive; providing such an improved handpiece which can be disassembled easily and conveniently for cleaning the interior of the handpiece to provide a more sanitary unit than heretofore possible with the all-metal one-piece constructions, and which will eliminate discarding of the entire handpiece when only one part thereof becomes damaged or excessively worn; and providing such an improved handpiece construction which achieves the desired results with less expense in both material and labor costs during manufacture thereof, which eliminates difficulties existing in the art, and which solves problems, satisfies needs and obtains new results.

These objectives and advantages are obtained by the improved handpiece for a meat-trimming knife of the type having an annular blade holder mounted on the handpiece with an annular cutting blade rotatably mounted on said holder, in which gear means is mounted on the handpiece and drivingly engages the cutting blade, in which flexible cable means extends into the handpiece and is operatively engaged with the gear means to drive said gear means and cutting blade, and in which ferrule means mounts the flexible cable means within the handpiece; wherein the improvement includes hollow handle means; a blade holder attachment portion on which the blade holder is adapted to be mounted; coupler means removably mounting the handle means on the blade attachment portion, said coupler means being formed with a bore; bearing means provided in the bore of the coupler means for rotatably supporting the ferrule means in said coupler means bore; and sealing means mounted in the bore of the coupler means for sealing engagement with the ferrule means to prevent passage of contaminants along the ferrule means.

BREIF DESCRIPTION OF THE DRAWINGS

Further objectives and advantages of the invention will be hereinafter referred to and/or be apparent from the following description of the preferred embodiment of the improved handpiece construction shown particularly in the accompanying drawings and set forth in the appended claims.

DESCRIPTION OF THE PREFERRED EMBODIMENT

Figure 1:
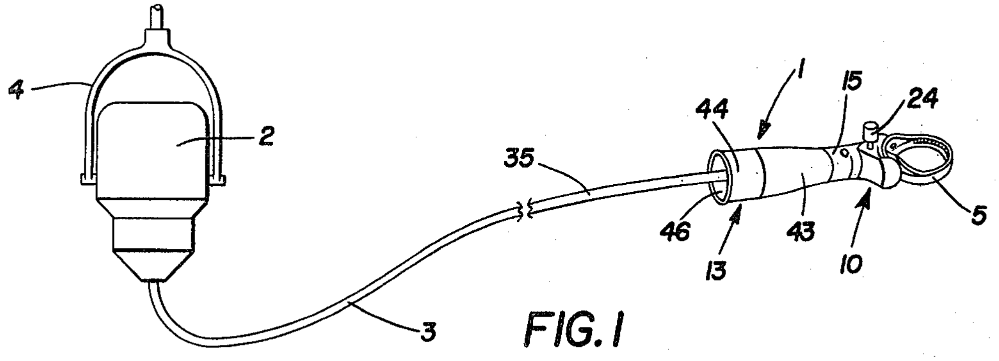
FIG. 1 is a generally diagrammatic perspective view showing a usual electrically driven meat-cutting assembly of the type having the improved handpiece as a part thereof.
Figure 2:
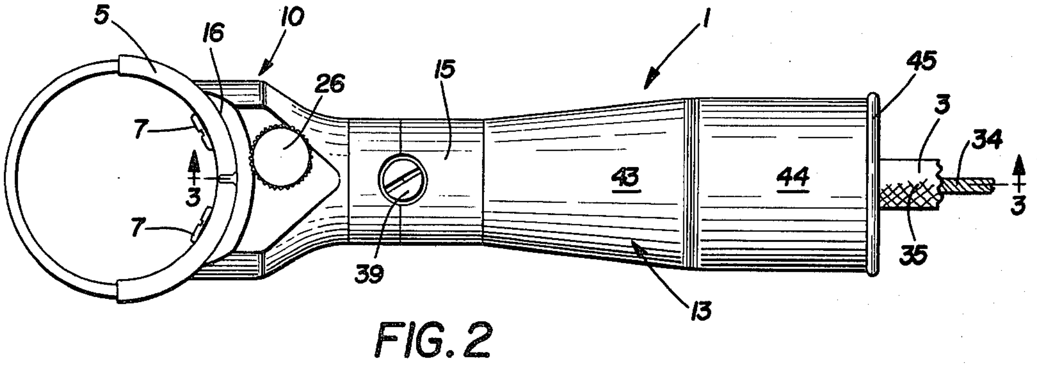
FIG. 2 is an enlarged top plan view of the improved handpiece having a blade holder and blade mounted thereon with the portion of the drive cable and covering extending out of the rear of the handpiece.

The improved handpiece of the invention is indicated generally at 1, and is shown in FIG. 1 connected to an electric motor 2 by a flexible drive 3. The electric motor is usually supported by a hanger 4 closely adjacent to the work table on which the meat-trimming operation is being performed. A usual annular metal blade holder 5 or a combination metal and plastic blade holder similar to that shown in my copending application Ser. No. 61,593, filed July 30, 1979, is mounted on the front end of handpiece 1 by a pair of mounting screws 7. An annular cutting blade 6 similar to the types of blades shown in U.S. Pat. Nos. 3,269,010, 3,461,557, and 3,852,882 is rotatably mounted on blade holder 5 and forms no particular part of the present invention. The blade is provided with a plurality of gear teeth 8 which are formed about the upper edge of blade 6.

Figures 4, 5, 6, 7, 8:
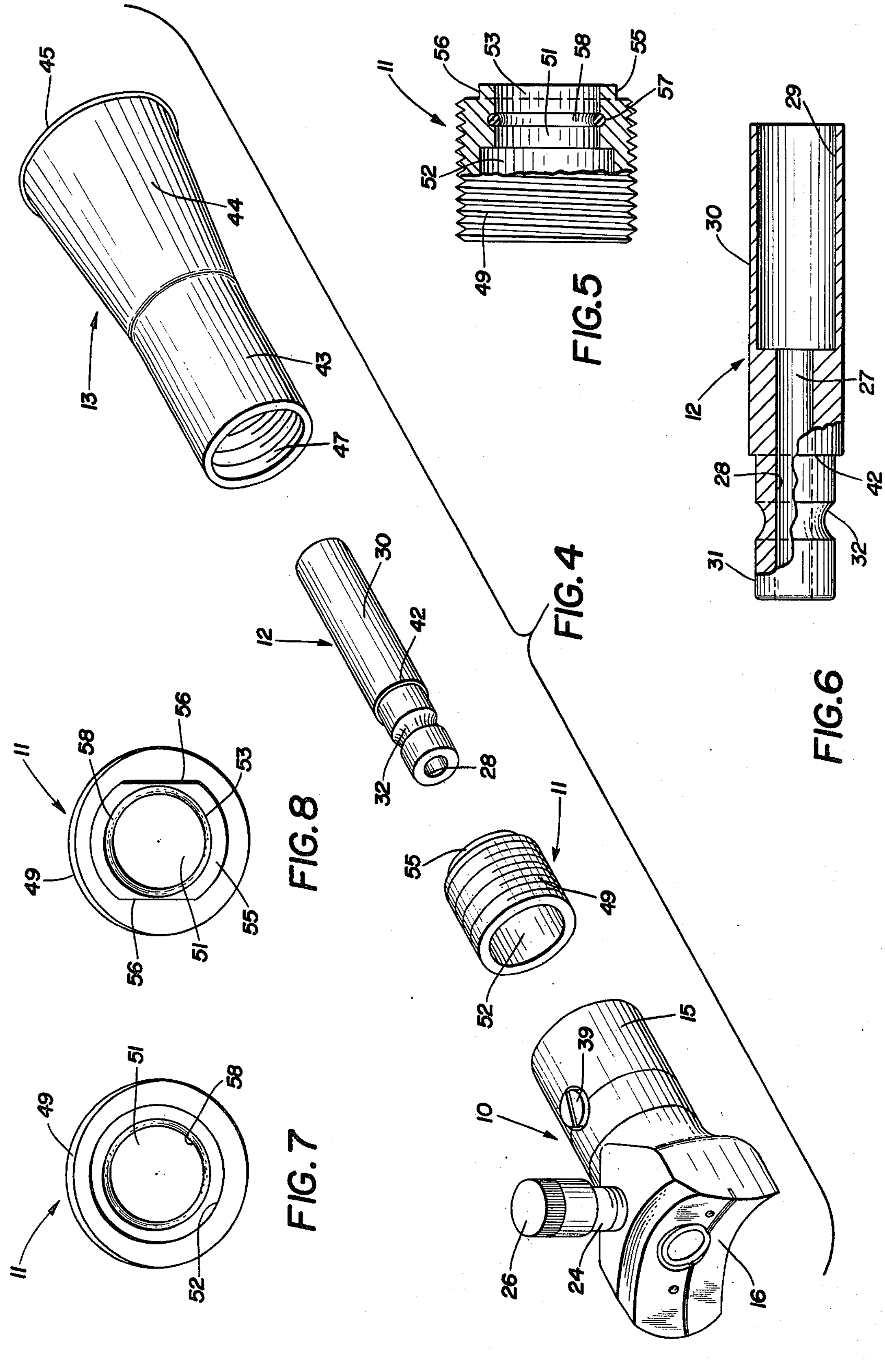
FIG. 4 is an exploded perspective view of the major components of the improved handpiece.
FIG. 5 is an enlarged view, portions of which are broken away and in section, of the threaded coupler of the improved handpiece.
FIG. 6 is an enlarged view, portions of which are broken away and in section, of the casing terminal ferrule used in the improved handpiece.
FIG. 7 is a left-hand end view of the threaded coupler shown in FIG. 5.
FIG. 8 is a right-hand end view of the threaded coupler shown in FIG. 5.

The main components of improved handpiece 1 are shown in FIG. 4 and include a blade holder attachment portion 10, a threaded coupler 11, a cable casing ferrule 12, and a handle 13.

Blade holder attachment portion 10 is similar to the front portion of the integral all-metal one-piece prior art handpieces and consists of a tubular body 15 which terminates in an arcuate-shaped blade attachment front portion 16 formed integrally with body 15 which provides the support and attachment means for blade holder 5. Tubular body 15 is formed with a central bore 17 which extends through body 15 and consists of an enlarged front portion 18 and a smaller diameter rear portion 19. A cylindrical sleeve bearing 20 is mounted within enlarged front bore portion 18 and telescopically receives and rotatably mounts pinion gear 21 therein.

A grease reservoir 24 is mounted on tubular body 15 and communicates with bore 17. Reservoir 24 contains a supply of edible grease which is discharged onto bearing 20 through an opening 25 by rotation of reservoir cap 26 in a usual manner well known in the art. This grease also provides lubrication for the meshing engagement between the teeth of pinion gear 21 and blade gear teeth 8.

Ferrule 12 (FIG. 6) is of a usual tubular configuration and includes a through bore 27 having a front bore portion 28 which is smaller in diameter than an enlarged rear bore portion 29. The outer surface of ferrule 12 has a cylindrical rear portion 30 and a smaller diameter cylindrical front portion 31. An annular groove 32 is formed in the middle of the smaller diameter front portion 31.

Flexible drive 3 also is of the usual construction used for electric cable-driven trimming knives (FIG. 3) having an interior flexible cable 34 which is rotatably mounted and housed within an outer casing 35. Casing 35 terminates within enlarged bore 29 of ferrule 12 and is secured therein by swaging or crimping rear ferrule portion 30. Flexible cable 34 extends through bore 27 of ferrule 12 and terminates in a squared end 37. Squared cable end 37 extends into a complementary-shaped squared opening 38 formed in the rear of pinion gear 21 and provides the driving connection between cable 34 and gear 21 in a conventional manner.

A handpiece setscrew 39 is threadably mounted within a radially extending threaded hole 40 formed in tubular body portion 15 and has a rounded end 41 which is seated within ferrule groove 32. Setscrew 39 prevents axial or longitudinal movement of ferrule 12 and drive cable casing 35 from within handpiece 1, while permitting rotational movement of ferrule 12 within the handpiece.

The various components described in detail above and their interrelationship with respect to each other are well known in the art and do not form a part of the invention, per se, but only when combined with the unique features and combinations described below.

In accordance with the invention, handle 13 is removably mounted on the rear of blade holder attachment portion 10 by threaded coupler 11. Handle 13 has a generally hollow tubular configuration with a conical front portion 43 terminating in an integrally formed rear cylindrical portion 44. Cylindrical portion 44 terminates in an annular bead 45 which provides strength and rigidity to the open end 46 of handle 13. Conical portion 43 has an internally threaded area 47 adjacent its inner end for threadedly mounting handle 13 on the external threads 49 which extend throughout the length of threaded coupler 11. A greatly enlarged rear bore portion 22 of tubular body bore 17 is formed with internal threads 50 which also are threadably engaged with a portion of the external threads 49 of coupler 11. When mounting handle 13 on blade holder attachment portion 10, coupler 11 is advanced within enlarged bore 22 until butting against annular shoulder 23 formed therein. Handle 13 then is threadedly advanced along the remaining externally threaded portion of coupler 11 until abutting against the annular edge of blade holder attachment portion 10, as shown in FIG. 3, completely concealing threaded coupler 11 therein.

In accordance with another of the main features of the invention, handle 13 is formed of a lightweight plastic material. One example of such plastic material is sold by E. I. Du Pont de Nemours and Company under its trademark ZYTEL. Another type of plastic found suitable is a polycarbonate produced by General Electric Company under its trademark LEXAN.

The main feature of the invention is threaded coupler 11 which, in addition to providing a means of detachable connecting handle 13 onto the rear of blade holder attachment portion 10, provides the increased effective bearing support for ferrule 12. Coupler 11 has a cylindrical outer surface formed with external threads 49 which extend generally throughout the entire length thereof (FIG. 5). Coupler 11 is formed with a stepped internal through bore 51 having a large diameter front portion 52 and a smaller diameter rear portion 53. An oblong-shaped collar 55 (FIG. 8) having a pair of straight sides 56 is formed on the rear end of coupler 11 to provide a means for applying a wrench or tool for threadably advancing coupler 11 against shoulder 23 of blade holder attachment portion 10 when assembling handpiece 1. An annular groove 57 is formed in the cylindrical wall of bore 53 for receivably mounting an O-ring 58 therein. O-ring 58 is formed of a resilient sealing material and provides an important feature of the improved handpiece.

Figure 3:
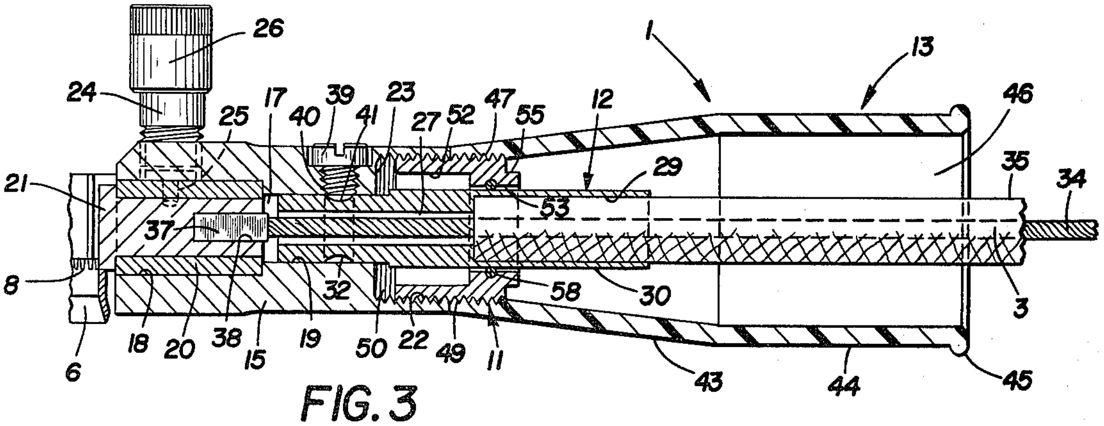
FIG. 3 is an enlarged longitudinal sectional view taken on line 3—3, FIG. 2.
Figure 9:
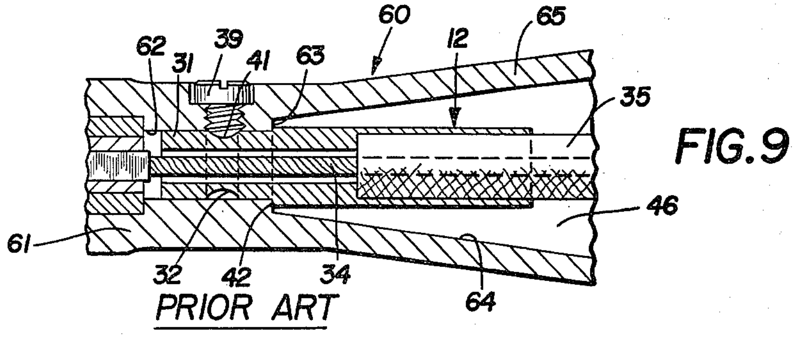
FIG. 9 PRIOR ART
FIG. 9 is a fragmentary sectional view of a prior art handpiece showing the heretofore ferrule mounting arrangement.

The advantages and improvements achieved by threaded coupler 11 can be seen be a comparison of the cross-sectional configuration of improved handpiece 1, as shown in FIG. 3, with a similar cross-sectional view of a prior art handpiece shown in FIG. 9. In the prior art all-metal one-piece handpiece construction shown in FIG. 3 and indicated generally at 60, the blade holder attachment portion 61 has a cylindrical bore 62. Bore 62 terminates in a shoulder 63 formed by the junction with the conical-shaped hollow interior 64 of the integrally formed metal handle portion 65. Ferrule 12 is mounted within handpiece 60 by setscrew 39 with an annular ferrule shoulder 42 that is formed at the junction of cylindrical outer surfaces 30 and 31, abutting against interior shoulder 63 of the handpiece.

With this prior art ferrule mounting arrangement, the ferrule is retained entirely within the handpiece by the engagement of setscrew end 41 in ferrule groove 32 with the reduced diameter front surface 31 of the ferrule being rotatably supported by the complementary-shaped and sized cylindrical bore portion 62, as shown in FIG. 9. Thus, the entire axial length of ferrule 12 is supported only by the portion of handpiece bore 62 which extends from the forward end of ferrule 12 rearwardly to ferrule shoulder 42.

The continual manual twisting movement which is imparted to the handpiece during its use results in a flexing and twisting movement on ferrule 12, which wears away and enlarges the portion of handpiece bore 62 which rotatably supports ferrule end surface 31. This action ultimately increases the diameter of bore 62 to such an extent, whereupon that portion of cable 34 located within the ferrule bore 28 will contact the interior of the ferrule, resulting in excess vibration and noise and discomfort to the operator. Also, the enlarged bore portion in the handpiece eventually prevents setscrew end 41 from seating within ferrule groove 32, whereupon the ferrule and drive casing 35 will pull away from setscrew 39 and out of the rear of the handpiece.

Referring to FIG. 3, the internal cylindrical wall forming the small bore portion 53 of coupler bore 51 has a diameter complementary to the diameter of ferrule surface 30 which is telescopically received therein. This wall or bore provides a bearing support surface for the rear portion of ferrule 12 and is spaced rearwardly from the front bearing support surface thereof provided by the smaller rear bore portion 19 of blade holder attachment portion 10. Thus, a comparison of FIG. 3 to that of FIG. 9 shows the improved handpiece provides a spaced bearing support arrangement for ferrule 12 by means of coupler 11 and its mounting with blade holder attachment portion 10 in contrast to the single front bearing support area provided by the prior art one-piece handpiece. Likewise, O-ring 58 which is located in this bearing support surface of coupler 11 prevents or greatly reduces the passage of grease rearwardly along the ferrule from pinion gear 21 and onto casing 35 and out of open handle end 46 where it can drop off onto the meat being trimmed. Also, O-ring 58 will prevent the passage of any moisture which may move along the exterior of casing 35 and enter open end 36 of the handle from reaching the interior of the handpiece and, in particular, the pinion drive gear and ferrule support area.

Likewise, referring again to FIG. 3, should either front blade attachment portion 10 or handle 13 become damaged, only the damaged component need be replaced due to the removable mounting of these components by coupler 11. Also, handle 13 can be easily disassembled from attachment portion 10 and coupler 11 to provide access to the interior of handle 13 and to the interior of attachment portion 10 for the periodic cleaning thereof, preventing the build-up of meat particles, grease and other contaminants.

The plastic material from which handle 13 preferably is formed provides insulation for an operator's hand. This eliminates the operator's hand from continually grasping an excessively cold piece of metal. Likewise, the plastic material from which handle 13 is formed is less expensive than the material of the all-metal handles, and is considerably lighter in weight, and can be formed more easily by known plastic-molding procedures than by the more expensive metal-working procedures required for the all-metal constructed handpieces.

As will be apparent to those skilled in the art to which the invention relates, the above-described invention should not be limited to the particular construction shown and described but may be modified; and it is the intention to hereby cover all adaptations, modifications and uses thereof which come within the practice of those skilled in the art to which the invention relates, and should not be so limited but include those changes and modifications coming within the terms of the claims set forth below.

I claim:

1. An improved handpiece for a meat-trimming knife of the type having an annular blade holder mounted on the handpiece with an annular cutting blade rotatably mounted on said holder, in which gear means is mounted on the handpiece and drivingly engages the cutting blade, in which flexible cable means extends into the handpiece and is operatively engaged with the gear means to drive said gear means and cutting blade, and in which ferrule means mounts the flexible cable means within the handpiece; wherein the improvement includes hollow handle means; a blade holder attachment portion on which the blade holder is adapted to be mounted; coupler means removably mounting the handle means on the blade holder attachment portion, said coupler means being formed with a bore; bearing means provided in the bore of the coupler means for rotatably supporting the ferrule means in said coupler means bore; and sealing means mounted in the bore of the coupler means for sealing engagement with the ferrule means to prevent passage of contaminants along the ferrule means.

2. The improved handpiece defined in claim 1 in which the handle means is a generally tubular-shaped handle formed of a plastic material.

3. The improved handpiece defined in claim 1 in which the blade holder attachment portion and handle means are formed with internally threaded end portions; and in which the coupler means is formed with external threads and is threadedly engaged with said internally threaded end portions of said blade holder attachment portion and handle means for joining the same.

4. The improved handpiece defined in claim 1 in which the ferrule means has an elongated tubular shape and is formed with a bore extending therethrough; in which an annular groove is formed in an outer surface of the ferrule means; and in which setscrew means is mounted on the blade holder attachment portion and is engaged with said annular groove of the ferrule means to mount said ferrule means within an open end of said blade holder attachment portion.

5. The improved handpiece defined in claim 4 in which the bore of the ferrule means has an enlarged diameter end portion which is located within the handle means; in which the flexible cable means has an outer casing and an inner cable; and in which said outer casing of the cable means terminates within the enlarged diameter end portion of the ferrule means with the inner cable extending through the bore of said ferrule means and into driving engagement with the gear means.

6. The improved handpiece defined in claim 1 in which at least a portion of the internal bore of the coupler means has an internal diameter complementary to the outer diameter of a portion of the ferrule means to form the bearing means for the ferrule means; and in which the sealing means is mounted on said complementary portion of the coupler means.

7. The improved handpiece defined in claim 6 in which the sealing means is an O-ring; and in which said O-ring is seated in an annular groove formed in the bore of the coupler means.

8. The improved handpiece defined in claim 1 in which a forward portion of the ferrule means is formed with an annular external groove; in which setscrew means is mounted in a radially extending threaded hole formed in the blade holder attachment portion and is engaged in the external groove of the ferrule means to prevent axial movement of said ferrule means with respect to said blade holder attachment portion; in which the blade holder attachment portion has an internal bore, a portion of which has a diameter complementary to the diameter of the forward portion of the ferrule means to rotatably support said forward portion of the ferrule means in the handpiece; and in which the bearing means of the coupler means is spaced rearwardly from the internal bore of the blade holder attachment portion to provide a pair of spaced support bearings for the ferrule means.

9. A meat-trimming device including:

(a) a handpiece having front and rear ends, with said rear end being removably mounted on the front end;

(b) a blade holder mounted on the front end of the handpiece;

(c) an annular cutting blade rotatably mounted on the blade holder;

(d) gear means mounted in the front end of the handpiece and drivingly engaged with the cutting blade;

(e) electrically driven flexible cable means extending into the handpiece through the rear end of said handpiece, said cable means having an outer casing and an inner cable with said inner cable being operatively engaged with the gear means for driving said gear means and cutting blade;

(f) ferrule means rotatably mounted in the handpiece, said ferrule means having a bore with the inner cable extending through said bore for engagement with the gear means and with the casing of the flexible cable means terminating in the bore of the ferrule means;

(g) means provided on the handpiece and operatively engaged with the ferrule means rotatably supporting a forward portion of said ferrule means within the handpiece and preventing axial movement of the ferrule means with respect to the handpiece; and (h) coupler means removably mounting the rear end of the handpiece on the front end of said handpiece, said coupler means having an internal bore rotatably supporting a rearward portion of the ferrule means at a location spaced from the means provided on the handpiece which rotatably supports the formed portion of said ferrule means.

10. The device defined in claim 9 in which the rear end of the handpiece is a generally tubular-shaped handle formed of plastic.

11. The device defined in claim 9 in which the coupler means is an externally threaded cylindrical-shaped sleeve having a bore; in which the ferrule means is a cylindrical-shaped tube; in which one portion of the coupler means bore has an internal diameter complementary to an outer diameter of the ferrule means tube; and in which said ferrule means tubbe is telescopically mounted within said one portion of the coupler means bore to rotatably support said ferrule means therein.

12. The device defined in claim 11 in which sealing means is mounted in said one portion of the coupler means bore and is in sealing engagement with the ferrule means tube telescopically mounted therein.

13. The device defined in claim 12 in which the sealing means is an O-ring; and in which said O-ring is seated in an annular groove formed in said one portion of the coupler means bore.

14. The device defined in claim 9 in which the ferrule means is a stepped cylindrical-shaped tube; in which the front end of the handpiece has an internal bore, a portion of which has a diameter complementary to an outer diameter of a forward portion of the ferrule means tube; and in which said forward portion of said ferrule means tube is telescopically mounted within said portion of the handpiece front end bore to rotatably support said ferrule means therein.

15. The device defined in claim 14 in which an annular groove is formed in the forward portion of the ferrule means tube; and in which setscrew means is mounted on the front end of the handpiece and extends into the annular groove of the ferrule means tube to prevent axial movement of said tube from the handpiece.

* * * * *